(12) United States Patent
Yang

(10) Patent No.: US 9,645,683 B2
(45) Date of Patent: May 9, 2017

(54) RECOGNITION METHOD FOR INPUT DEVICE, RECOGNITION DEVICE, ELECTRONIC DEVICE AND INPUT DEVICE

(71) Applicants: Beijing Lenovo Software Ltd., Beijing (CN); Lenovo (Beijing) Co., Ltd., Beijing (CN)

(72) Inventor: Guang Yang, Beijing (CN)

(73) Assignees: Beijing Lenovo Software Ltd., Beijing (CN); Lenovo (Beijing) Co., Ltd., Beijing (CN)

(*) Notice: Subject to any disclaimer, the term of this patent is extended or adjusted under 35 U.S.C. 154(b) by 482 days.

(21) Appl. No.: 14/022,602

(22) Filed: Sep. 10, 2013

(65) Prior Publication Data
US 2014/0078103 A1   Mar. 20, 2014

(30) Foreign Application Priority Data
Sep. 17, 2012 (CN) .......................... 2012 1 0345482

(51) Int. Cl.
*G06F 3/044* (2006.01)
*G06F 3/038* (2013.01)

(52) U.S. Cl.
CPC .............. *G06F 3/044* (2013.01); *G06F 3/038* (2013.01)

(58) Field of Classification Search
CPC ........ G06F 3/038; G06F 3/0416; G06F 3/044; G06F 2203/04101; G06F 2203/04104; G06F 3/041; G06F 3/0488; G06F 3/0421; G06F 2203/04108; G06F 3/03545
USPC .......................... 345/156, 173, 174, 175, 179
See application file for complete search history.

(56) References Cited

U.S. PATENT DOCUMENTS

| 7,855,718 | B2 | 12/2010 | Westerman |
| 8,068,125 | B2 | 11/2011 | Pantfoerder |
| 8,130,203 | B2 | 3/2012 | Westerman |
| 8,243,041 | B2 | 8/2012 | Westerman |

(Continued)

FOREIGN PATENT DOCUMENTS

| CN | 101551723 A | 10/2009 |
| CN | 101583924 A | 11/2009 |
| JP | H047628 A | 10/1992 |

OTHER PUBLICATIONS

First Chinese Office Action regarding Application No. 201210345482.5 dated Jan. 13, 2016. English translation provided by Unitalen Attorneys at Law.

*Primary Examiner* — Jose Soto Lopez
(74) *Attorney, Agent, or Firm* — Harness, Dickey & Pierce, P.L.C.

(57) ABSTRACT

A recognition method for an input device is disclosed in the present invention, which is applied to an electronic device with a capacitive touch screen having a function of height detection, different input devices have different electric field height information. The method includes: obtaining the electric field height information of the input device, upon detection of a touch control operation of the input device; and determining attribute information of the input device according to a preset correspondence between the electric field height information and the attribute information of the input device. In the recognition method for the input device disclosed in the present disclosure, after it is determined that a touch control operation is performed on the capacitive touch screen by the input device, the electric field height information of the input device is obtained.

8 Claims, 5 Drawing Sheets (56) References Cited

U.S. PATENT DOCUMENTS

| | | |
|---|---|---|
| 8,384,684 B2 | 2/2013 | Westerman |
| 8,405,688 B2 | 3/2013 | Pantfoerder |
| 8,531,425 B2 | 9/2013 | Westerman |
| 8,542,210 B2 | 9/2013 | Westerman |
| 8,743,161 B2 | 6/2014 | Pantfoerder |
| 8,791,921 B2 | 7/2014 | Westerman |
| 9,024,906 B2 | 5/2015 | Westerman |
| 9,082,336 B2 | 7/2015 | Pantfoerder |
| 9,218,070 B2 * | 12/2015 | Oda .................... G06F 3/03545 |
| 2008/0158145 A1 | 7/2008 | Westerman |
| 2008/0158174 A1 * | 7/2008 | Land .................... G06F 3/0418 345/173 |
| 2008/0158185 A1 | 7/2008 | Westerman |
| 2008/0165203 A1 | 7/2008 | Pantfoerder |
| 2011/0080365 A1 | 4/2011 | Westerman |
| 2011/0273376 A1 * | 11/2011 | Dickinson ........... G06F 3/03545 345/173 |
| 2012/0068981 A1 | 3/2012 | Pantfoerder |
| 2012/0113041 A1 | 5/2012 | Westerman |
| 2012/0287074 A1 | 11/2012 | Westerman |
| 2013/0002614 A1 * | 1/2013 | Nowatzyk ............. G06F 3/0488 345/179 |
| 2013/0155022 A1 | 6/2013 | Westerman |
| 2013/0176293 A1 | 7/2013 | Pantfoerder |
| 2014/0049495 A1 | 2/2014 | Westerman |
| 2014/0247234 A1 | 9/2014 | Pantfoerder |
| 2014/0333586 A1 | 11/2014 | Westerman |
| 2015/0199070 A1 | 7/2015 | Westerman |
| 2015/0310795 A1 | 10/2015 | Pantfoerder |

* cited by examiner

FIG. 8

RECOGNITION METHOD FOR INPUT DEVICE, RECOGNITION DEVICE, ELECTRONIC DEVICE AND INPUT DEVICE

CROSS-REFERENCE TO RELATED APPLICATIONS

The present application claims priority to Chinese Patent Application No. 201210345482.5, filed on Sep. 17, 2012, the entire disclosure of which is incorporated herein by reference.

FIELD OF THE INVENTION

The present disclosure belongs to the technical field of touch control of an electronic device, and in particular to a recognition method for an input device, a recognition device, an electronic device and an adapted input device.

BACKGROUND OF THE INVENTION

With the development of science and technology, touch control technology is becoming more and more mature. As an important branch of the touch control technology, a capacitive touch screen has been widely used in various electronic devices. Presently, a capacitive touch screen with a function of height detection has appeared, with which a user can perform a touch control operation at a certain distance in front of the capacitive touch screen without contacting a surface of the capacitive touch screen.

The capacitive touch screen has a function of multi-touch, in which the touch operation may be performed by various objects. In some application scenes, the objects that perform the touch operation need to be distinguished. For example, the user generally uses a touch pen to perform the touch operation when drawing a picture on the capacitive touch screen of the electronic device, the electronic device acquires the trace generated by the touch pen as input data and performs a following process; however, the finger or the hand of the user may possibly touch the capacitive touch screen during the drawing, the touch trace (which can be considered as invalid data) generated by the finger or the hand will also be acquired by the electronic device, and a false picture line is generated, in which case the user must do an erasing work to remove the false line, thereby increasing the burden of the electronic device.

Therefore, the problem which needs to be considered by those skilled in the art is how to distinguish the objects that perform the touch control operation so as to meet the requirement of the electronic device in different application scenes.

SUMMARY OF THE INVENTION

In view of this, an object of the present disclosure is to provide a recognition method for an input device, a recognition device and an electronic device, for recognizing and distinguishing input devices that perform a touch control operation on a capacitive touch screen. An input device adapted to the recognition method is further provided in the present disclosure.

To achieve the above objects, the flowing technical solutions are provided in the present disclosure.

A recognition method for an input device, applied to an electronic device with a capacitive touch screen which has a function of height detection, different input devices having different electric field height information, wherein the method includes: obtaining the electric field height information of the input device, upon detection of a touch operation of the input device; and determining attribute information of the input device according to a preset correspondence between the electric field height information and the attribute information of the input device.

Preferably, in the above method, the input device may include an electrical conductor located at an adjustable height, the electrical conductor may have one end thereof connected to the ground, the electrical conductor in the input device is located at a constant height during the touch control operation; and the obtaining the electric field height information of the input device may include: obtaining a capacitance value at a position of the capacitive touch screen in contact with the input device; and obtaining an electric field height value matching the capacitance value according to a preset correspondence between the capacitance value and the electric field height value, and setting the obtained electric field height value as the electric field height information of the input device.

Preferably, in the above method, the input device may include a plurality of electrical conductors located at different heights, the input device may connect/disconnect the plurality of electrical conductors in the input device to/from the ground in a preset order; and the obtaining the electric field height information of the input device may include: obtaining, in accordance with a preset strategy, a sequence of capacitance values for distinguishing different input devices; and obtaining electric field height values corresponding to the multiple capacitance values in the sequence of capacitance values respectively according to a preset correspondence between the capacitance value and the electric field height value, and setting the obtained electric field height values as the electric field height information of the input device.

Preferably, in the above method, the attribute information of the input device may include physical attribute information and/or role attribute information.

A recognition device, applied to an electronic device with a capacitive touch screen which has a function of height detection, wherein the recognition device includes: an information obtaining unit, adapted to obtain electric field height information of an input device upon detection of a touch control operation of the input device; and an information determining unit, adapted to determine attribute information of the input device according to a preset correspondence between the electric field height information and the attribute information of the input device.

Preferably, in the above recognition device, the input device may include an electrical conductor located at an adjustable height, the electrical conductor may have one end thereof grounded, the electrical conductor is located at a constant height in the input device during the touch control operation; and the information obtaining unit may include: a first obtaining module, adapted to obtain a capacitance value at a position of the capacitive touch screen in contact with the input device; and a first determining module, adapted to obtain an electric field height value matching the capacitance value according to a preset correspondence between the capacitance value and the electric field height value and set the obtained electric field height value as the electric field height information of the input device.

Preferably, in the above recognition device, the input device may include a plurality of electrical conductors located at different heights, the input device may connect/disconnect the plurality of electrical conductors in the input device to/from the ground in a preset order; and the information obtaining unit may include: a second obtaining module, adapted to obtain, in accordance with a preset strategy, a sequence of capacitance values for distinguishing different input devices; and a second determining module, adapted to obtain electric field height values corresponding to multiple capacitance values in the sequence of capacitance values respectively according to a preset correspondence between the capacitance value and the electric field height value and set the obtained electric field height values as the electric field height information of the input device.

An electronic device, including a capacitive touch screen which has a function of height detection, wherein the electronic device further includes a recognition device connected to the capacitive touch screen, with the recognition device being any one of the above recognition devices.

An input device, adapted to the above first recognition method for the input device, wherein the input device includes: a main body; and an electrical conductor movably connected onto the main body, wherein the electrical conductor is located at an adjustable height of the main body, and the electrical conductor has one end thereof connected to the ground.

Preferably, in the above input device, labels corresponding to different attribute information may be provided on the main body.

An input device, adapted to the above first recognition method for the input device, wherein the input device includes: a main body; a plurality of electrical conductors fixedly located at different heights of the main body; and a control circuit adapted to connect/disconnect the plurality of electrical conductors to/from the ground respectively.

Preferably, in the above input device, the control circuit may include a controller and a plurality of switching tubes; and one switching tube is be connected in series between one end of each electrical conductor and the ground, control terminals of the plurality of switching tubes may be connected to different I/O ports of the controller respectively.

It can be seen that the present disclosure has the following advantages. In the recognition method for the input device disclosed in the present disclosure, after it is determined that a touch control operation is performed on the capacitive touch screen by the input device, the electric field height information of the input device is obtained; because different input devices have different electric field height information, the attribute information of the input device can be determined according to the preset correspondence between the electric field height information and the attribute information, and thus various input devices can be recognized and distinguished.

BRIEF DESCRIPTION OF THE DRAWINGS

In order to illustrate the technical solutions according to the embodiments of the present invention or in the prior art more clearly, drawings to be used in the description of the prior art or the embodiments will be described briefly hereinafter. Apparently, the drawings described hereinafter are only some embodiments of the present invention, and other drawings may be obtained by those skilled in the art according to those drawings without creative labor.

DETAILED DESCRIPTION OF THE INVENTION

The technical solutions in the embodiments of the present invention will be described clearly and completely hereinafter in conjunction with the drawings in the embodiments of the present invention, so that the objects, technical solutions and advantages of the present invention will be clear. Apparently, the described embodiments are only a part but not all of the embodiments of the present invention. All the other embodiments can be obtained by those skilled in the art without creative effort on the basis of the embodiments of the present invention, which fall within the scope of protection of the present invention.

A recognition method for an input device is disclosed in the present disclosure, which is applied to an electronic device with a capacitive touch screen such as a mobile phone, a tablet computer or an intelligent television, and the capacitive touch screen has a function of height detection. With the recognition method disclosed in the present disclosure, input devices that perform a touch control operation on the touch screen can be recognized and distinguished. Various input devices in the present disclosure have different electric field heights.

First Embodiment

Figure 1:
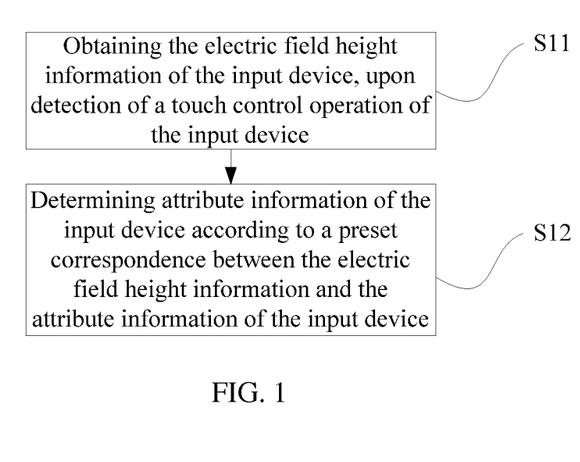
FIG. 1 is a flow chart of a recognition method for an input device disclosed in a first embodiment of the present disclosure.

Reference is made to FIG. 1, which is a flow chart of a recognition method for an input device disclosed in a first embodiment of the present disclosure. In the first embodiment, the input device has at least one electrical conductor; and when the input device contacts the capacitive touch screen in the electronic device, the capacitive touch screen having the function of height detection may senses the contact of the input device with the capacitive touch screen, and may detect the electric field height value of the input device (that is, the distance value between the electrical conductor in the input device and the capacitive touch screen).

The method includes the following steps S11 to S12.

Step S11: obtaining the electric field height information of the input device, upon detection of a touch control operation of the input device.

In the operation of the electronic device, it is detected whether a touch control operation is performed on the capacitive touch screen by the input device in real time. The touch control operation may be a clicking operation, a sliding operation or stay of the input device on the capacitive touch screen. When it is determined that a touch control operation is performed on the capacitive touch screen by the input device, the electric field height information of the input device is obtained. The electric field height information may include only an electric field height value, and may also be a combination of multiple electric field height values.

Step S12: determining attribute information of the input device according to a preset correspondence between the electric field height information and the attribute information of the input device.

Because the capacitive touch screen has the function of multi-touch, touch control operations may be performed on one capacitive touch screen by using multiple input devices at the same time. In the present disclosure, different electric field height information is preset for various input devices. That is to say, each input device has unique electric field height information. Therefore, a correspondence may be established between the electric field height information of each input device and the attribute information thereof, and may be stored in the electronic device. After the electric field height information of the input device is obtained in step S11, the attribute information of the input device may be determined according to the pre-stored correspondence, and thus the input device may be recognized and distinguished.

In the recognition method for the input device disclosed in the first embodiment of the disclosure, after it is determined that a touch control operation is performed on the capacitive touch screen by the input device, the electric field height information of the input device is obtained; because different input devices have different electric field height information, the attribute information of the input device can be determined according to the preset correspondence between the electric field height information and the attribute information of the input device, and thus various input devices can be recognized and distinguished.

Second Embodiment

Figure 2:
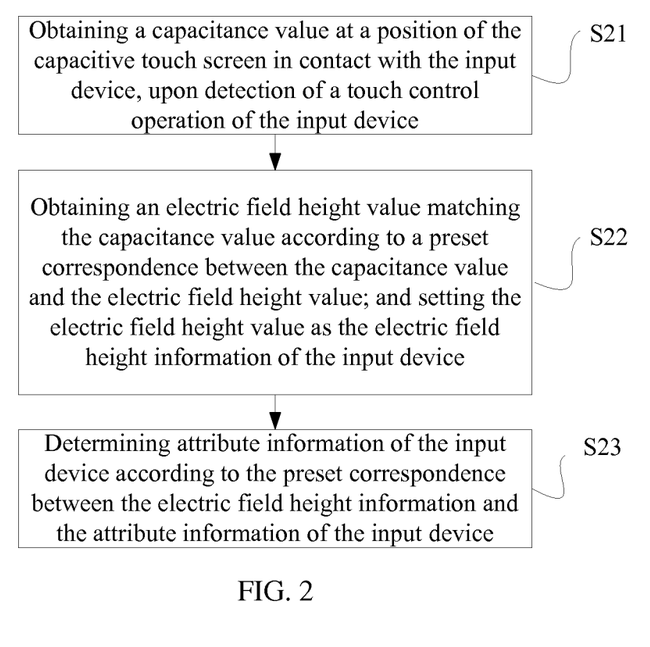
FIG. 2 is a flow chart of a recognition method for an input device disclosed in a second embodiment of the present disclosure.

Reference is made to FIG. 2, which is a flow chart of a recognition method for an input device disclosed in a second embodiment of the present disclosure. In the second embodiment, the input device includes an electrical conductor located at an adjustable height, the electrical conductor has one end thereof connected to the ground, and when a touch control operation is performed on the capacitive touch screen in the electric device by the input device, the electrical conductor is located at a constant height in the input device. The electrical conductors in different input devices are located at different heights.

The method includes the following steps S21 to S23.

Step S21: obtaining a capacitance value at a position of the capacitive touch screen in contact with the input device, upon detection of a touch control operation of the input device.

Because only one electrical conductor is provided in each input device, and the electrical conductor is located at a constant height in the input device during the touch control operation, the capacitance value at the position on the capacitive touch screen where the capacitive touch screen contacts the input device keeps constant when the input device performs the touch operation, and thus the capacitance value may be obtained at any time when the input device performs the touch control operation.

In implementation, the operation of obtaining the capacitance value may be performed at the time when the input device touches the capacitive touch screen, for shortening the time required by the electronic device to recognize the input device and improving the experience of the user.

Step S22: obtaining an electric field height value matching the capacitance value according to a preset correspondence between the capacitance value and the electric field height value; and setting the electric field height value as the electric field height information of the input device.

When the a touch control operation is performed on the capacitive touch screen by the input device, the capacitance value at the position on the capacitive touch screen where the capacitive touch screen contacts the input device varies, and the capacitance value and the electric field height value of the input device (that is, the distance value between the electrical conductor in the input device and the capacitive touch screen) have inverse relation. Specifically, the greater the electric field height value of the input device is, the smaller the capacitance value at the position on the capacitive touch screen where the capacitive touch screen contacts the input device is, and the smaller the electric field height value of the input device is, the greater the capacitance value at the position on the capacitive touch screen where the capacitive touch screen contacts the input device is. Multiple groups of corresponding electric field height values and capacitance values are obtained by limited times of experiments, and the correspondence may be established between the capacitance values and the electric field height values by performing data process. Because only one electrical conductor is provided in the input device in the second embodiment, the electric field height information of each input device includes only one electric field height value.

Step S23: determining attribute information of the input device according to the preset correspondence between the electric field height information and the attribute information of the input device.

In the recognition method for the input device disclosed in the second embodiment of the disclosure, an input device in which only one electrical conductor is provided is recognized and distinguished; after the capacitance value at the position on the capacitive touch screen where the capacitive touch screen contacts the input device is obtained, the electric field height value matching the obtained capacitance value is determined according to the preset correspondence between the capacitance value and the electric field height value, and the attribute information of the input device is determined by setting the electric field height value as the electric field height information of the input device.

Third Embodiment

Figure 3:
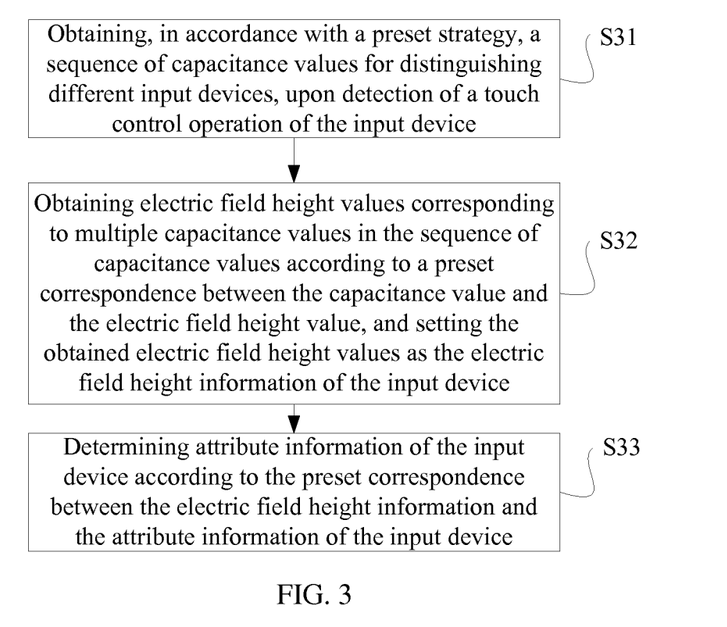
FIG. 3 is a flow chart of a recognition method for an input device disclosed in a third embodiment of the present disclosure.

Reference is made to FIG. 3, which is a flow chart of a recognition method for an input device disclosed in a third embodiment of the present disclosure.

The method includes the following steps S31 to S33.

Step S31: obtaining, in accordance with a preset strategy, a sequence of capacitance values for distinguishing different input devices, upon detection of a touch control operation of the input device.

The input device comprises a plurality of electrical conductors located at different heights, and during the touch control operation of the input device, the input device connects/disconnects the plurality of electrical conductors in the input device to/from the ground in a preset order. For example, in the input device A, an electrical conductor (represented as the electrical conductor 1) is provided at a preset height 1, an electrical conductor (represented as the electrical conductor 2) is provided at a preset height 2, an electrical conductor (represented as the electrical conductor 3) is provided at a preset height 3, and an electrical conductor (represented as the electrical conductor 4) is provided at a preset height 4. When the input device A performs the touch control operation on the capacitive touch screen, the input device A connects/disconnects the electrical conductor 1, the electrical conductor 4, the electrical conductor 2 and the electrical conductor 3 to/from the ground in this order. That is to say, the input device A connects the electrical conductor 1 to the ground at first, disconnects the electrical conductor 1 from the ground after a preset time, connects the electrical conductor 4 to the ground, disconnects the electrical conductor 4 from the ground after a preset time, connects the electrical conductor 2 to the ground at first, disconnects the electrical conductor 2 from the ground after a preset time, connects the electrical conductor 3 to the ground at first, and then disconnects the electrical conductor 3 from the ground after a preset time.

Different input devices may be provided with the same number of electrical conductors, the electrical conductors in various input devices are located at the same height, and different input devices connect/disconnect various electrical conductors to/from the ground in different preset order. For example, in the input device B, an electrical conductor (represented as the electrical conductor 1) is provided at a preset height 1, an electrical conductor (represented as the electrical conductor 2) is provided at a preset height 2, an electrical conductor (represented as the electrical conductor 3) is provided at a preset height 3, and an electrical conductor (represented as the electrical conductor 4) is provided at a preset height 4. When the input device B performs the touch control operation on the capacitive touch screen, the input device B connects/disconnects the electrical conductor 4, the electrical conductor 3, the electrical conductor 2 and the electrical conductor 1 to/from the ground in this order. That is to say, the input device B connects the electrical conductor 4 to the ground at first, disconnects the electrical conductor 4 from the ground after a preset time, connects the electrical conductor 3 to the ground, disconnects the electrical conductor 3 from the ground after a preset time, connects the electrical conductor 2 to the ground at first, disconnects the electrical conductor 2 from the ground after a preset time, connects the electrical conductor 1 to the ground at first, and then disconnects the electrical conductor 1 from the ground after a preset time.

When electrical conductors located at different heights are connected to the ground, different capacitance values will be generated in a detection layer of the capacitive touch screen, and after a period of switching operation (that is, the operation of connection/disconnection to/from the ground) is performed to the multiple electrical conductors in the input device in the preset order, a sequence of capacitance values including multiple different capacitance values is generated in the detection layer of the capacitive touch screen. If the numbers of the electrical conductors in individual input devices are the same, and the electrical conductors are located at the same height, but the preset orders are different, then when the individual input devices perform the touch operation on the capacitive touch screen, the sequences of capacitance values generated at the position on the capacitive touch screen where the capacitive touch screen contacts the input devices are different, and the sequences of capacitance values may be used to distinguish different input devices.

Certainly, different input devices may also be provided with the same number of electrical conductors, but not all the electrical conductors are provided at the same height in the input devices. Alternatively, not all the numbers of the electrical conductors provided in different input devices are the same. For the above two cases, when the individual input devices perform the touch operation on the capacitive touch screen, the sequences of capacitance values generated at the position on the capacitive touch screen where the capacitive touch screen contacts the input devices are also different, and the sequences of capacitance values may be used to distinguish different input devices.

If the switching strategies of the input devices for the multiple electrical conductors are different, the sequences of capacitance values for distinguishing different input devices may be obtained in accordance with different preset strategies.

For example, when the user performs the touch control operation on the capacitive touch screen by using multiple input devices, the input devices performs the operation to connect/disconnect the multiple electrical conductors therein to/from the ground in the preset order after it is determined that the input device contacts the capacitive touch screen. And this operation is performed only once and will not be performed repeatedly.

Then, the obtaining, in accordance with a preset strategy, a sequence of capacitance values for distinguishing different input devices includes: obtaining multiple capacitance values at the position on the capacitive touch screen where the capacitive touch screen contacts the input device; and determining the obtained multiple capacitance values as the corresponding sequence of capacitance values of the input device.

Because the input devices performs the operation to connect/disconnect the multiple electrical conductors therein to/from the ground in the preset order for one time after it contacts the capacitive touch screen, the multiple capacitance values generated at the position on the capacitive touch screen where the capacitive touch screen contacts the input device are used for distinguishing the input devices.

For example, when the user performs the touch control operation on the capacitive touch screen by using multiple input devices, the input devices perform the operation to connect/disconnect the multiple electrical conductors therein to/from the ground in the preset order circularly.

Then, the obtaining, in accordance with a preset strategy, a sequence of capacitance values for distinguishing different input devices includes: obtaining, in a preset time not less than two times of the time required by the input device to perform the operation to connect/disconnect the multiple electrical conductors therein to/from the ground in the preset order, multiple capacitance values at the position on the capacitive touch screen where the capacitive touch screen contacts the input device; searching for the pre-stored corresponding sequence of capacitance values of the input device from the obtained multiple capacitance values; and determining the searched out sequence of capacitance values as the sequence of capacitance values of the input device.

Because the input device performs the operation to connect/disconnect the multiple electrical conductors therein to/from the ground in the preset order circularly, the capacitance value at the position on the capacitive touch screen where the capacitive touch screen contacts the input device varies continuously when the input device performs the touch control operation on the capacitive touch screen, the obtained capacitance values contain surely the corresponding sequence of capacitance values of the input device if the time required to obtain the capacitance value is not less than two times of the time required by the input device to perform the operation to connect/disconnect the multiple electrical conductors therein to/from the ground in the preset order. The corresponding sequences of capacitance values of the input devices are pre-stored in the electronic device (the corresponding sequences of capacitance values of the input devices are different, then the input devices may be distinguished by the corresponding sequence of capacitance values of the input device), the corresponding sequence of capacitance values of the input device may be determined by performing a searching operation in the obtained multiple capacitance values.

Preferably, the preset time is set to be equal to two times of the time required by the input device to perform the operation to connect/disconnect the multiple electrical conductors therein to/from the ground in the preset order. Thereby not only the operation of obtaining the sequence of capacitance values can be achieved, but also the time consumption can be reduced as much as possible.

In the first manner, the input device must have the function of judging whether the input device contacts the capacitive touch screen, thereby the requirement on the hardware of the input device is high, the cost of the input device is correspondingly high, but the time required by the electronic device to recognize the input device is relatively short. In the second manner, the requirement on the hardware of the input device is low, the cost of the input device can be reduced correspondingly, but the time required for obtaining the sequence of capacitance values is relatively long, which results in that the time required by the electronic device to recognize the input device is relatively long.

Step S32: obtaining electric field height values corresponding to multiple capacitance values in the sequence of capacitance values respectively according to a preset correspondence between the capacitance value and the electric field height value, and setting the obtained electric field height values as the electric field height information of the input device.

Multiple electrical conductors are provided at different heights in the input device, and each electrical conductor may result in the variation in the capacitance value of the capacitive touch screen after being connected to the ground. The electric field height information of the input device includes multiple electric field height values.

Step S33: determining attribute information of the input device according to the preset correspondence between the electric field height information and the attribute information of the input device.

In the recognition method for the input device disclosed in the third embodiment of the present disclosure, input devices in which multiple electrical conductors are provided at different heights are recognized and distinguished; after the sequence of capacitance values for distinguishing different input devices is obtained, the electric field height values matching the multiple capacitance values in the sequence of capacitance values is determined according to the preset correspondence between the capacitance value and the electric field height value, and the attribute information of the input device is determined by setting multiple electric field height values as the electric field height information of the input device.

In the above embodiments, the attribute information of the input device includes physical attribute information and/or role attribute information.

The recognition method for the input device is disclosed above in the present disclosure, and a recognition device is further disclosed accordingly in the present disclosure, for recognizing and distinguishing the input devices that perform the touch control operation on the capacitive touch screen of the electronic device, with each input device having different electric field height. The electronic device may be a mobile phone, a tablet computer or an intelligent television, and the capacitive touch screen has a function of height detection.

Fourth Embodiment

Figure 4:
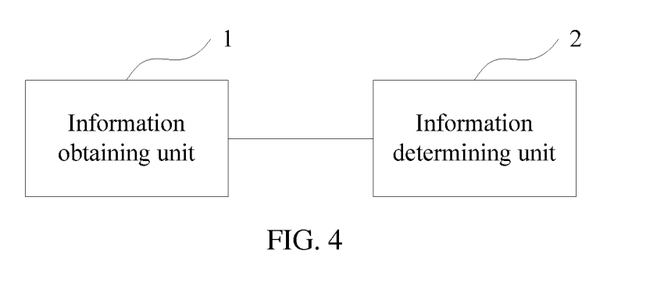
FIG. 4 is a schematic structural diagram of a recognition device disclosed in a fourth embodiment of the present disclosure.

Reference is made to FIG. 4, which is a schematic structural diagram of a recognition device disclosed in a fourth embodiment of the present disclosure. The recognition device includes an information obtaining unit 1 and an information determining unit 2.

The information obtaining unit 1 is adapted to obtain electric field height information of an input device upon detection of a touch control operation of the input device. In the operation of the electronic device, it is detected whether a touch control operation is performed on the capacitive touch screen by the input device in real time. The touch control operation may be a clicking operation, a sliding operation or stay of the input device on the capacitive touch screen. When it is determined that a touch control operation is performed on the capacitive touch screen by the input device, the electric field height information of the input device is obtained. The electric field height information may include only an electric field height value, and may also be a combination of multiple electric field height values.

The information determining unit 2 is adapted to determine attribute information of the input device according to a preset correspondence between the electric field height information and the attribute information. Because the capacitive touch screen has the function of multi-touch, touch control operations may be performed on one capacitive touch screen by using multiple input devices at the same time. In the present disclosure, different electric field height information is preset for various input devices. That is to say, each input device has unique electric field height information. Therefore, correspondence may be established between the electric field height information of each input device and the attribute information thereof, and may be stored in the electronic device. After the electric field height information of the input device is obtained by information obtaining unit 1, the attribute information of the input device may be determined according to the pre-stored correspondence, and thus the input devices may be recognized and distinguished.

In the recognition device disclosed in the fourth embodiment of the disclosure, after it is determined that a touch control operation is performed on the capacitive touch screen by the input device, the electric field height information of the input device is obtained; because different input devices have different electric field height information, the attribute information of the input device can be determined according to the preset correspondence between the electric field height information and the attribute information, and thus various input devices can be recognized and distinguished.

Fifth Embodiment

Figure 5:
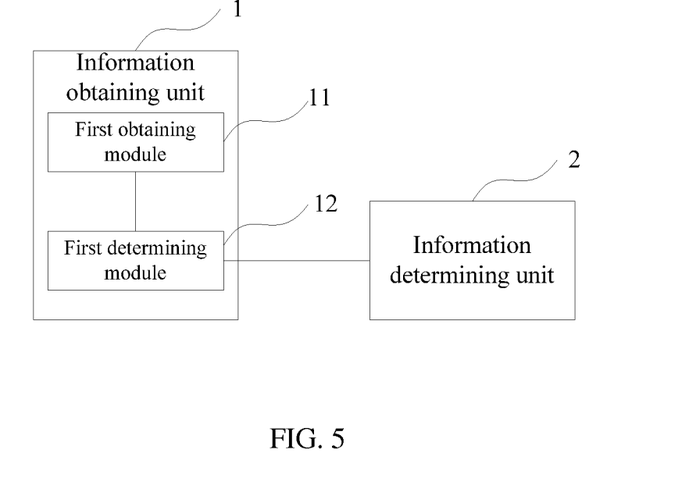
FIG. 5 is a schematic structural diagram of a recognition device disclosed in a fifth embodiment of the present disclosure.

Reference is made to FIG. 5, which is a schematic structural diagram of a recognition device disclosed in a fifth embodiment of the present disclosure.

The input device adapted to the recognition device disclosed in the fifth embodiment includes an electrical conductor located at an adjustable height, the electrical conductor has one end thereof connected to the ground, and when a touch control operation is performed on the capacitive touch screen in the electric device by the input device, the electrical conductor is located at a constant height in the input device. The electrical conductors in different input devices are located at different heights.

The recognition device includes an information obtaining unit 1 and an information determining unit 2, with the information obtaining unit 1 including a first obtaining module 11 and a first determining module 12.

The first obtaining module 11 is adapted to obtain a capacitance value at a position of the capacitive touch screen in contact with the input device. Because only one electrical conductor is provided in each input device, and the electrical conductor is located at a constant height in the input device during the touch control operation, the capacitance value at the position on the capacitive touch screen where the capacitive touch screen contacts the input device keeps constant when the input device performs the touch control operation, and thus the capacitance value may be obtained at any time when the input device performs the touch control operation.

The first determining module 12 is adapted to obtain an electric field height value matching the capacitance value according to a preset correspondence between the capacitance value and the electric field height value and set the obtained electric field height value as the electric field height information of the input device. When the a touch control operation is performed on the capacitive touch screen by the input device, the capacitance value at the position on the capacitive touch screen where the capacitive touch screen contacts the input device varies, and the capacitance value and the electric field height value of the input device (that is, the distance value between the electrical conductor in the input device and the capacitive touch screen) have inverse relation. Specifically, the greater the electric field height value of the input device is, the smaller the capacitance value at the position on the capacitive touch screen where the capacitive touch screen contacts the input device is, and the smaller the electric field height value of the input device is, the greater the capacitance value at the position on the capacitive touch screen where the capacitive touch screen contacts the input device is. Multiple groups of electric field height values and capacitance values are obtained by limited times of experiments, and the correspondence may be established between the capacitance value and the electric field height value by performing data process. Because only one electrical conductor is provided in the input device in the second embodiment, the electric field height information of each input device includes only one electric field height value.

The recognition device disclosed in the fifth embodiment of the disclosure is adapted to the input device in which only one electrical conductor is provided. After the capacitance value at the position on the capacitive touch screen where the capacitive touch screen contacts the input device is obtained, the electric field height value matching the obtained capacitance value is determined according to the preset correspondence between the capacitance value and the electric field height value, and the attribute information of the input device is determined by setting the electric field height value as the electric field height information of the input device.

Sixth Embodiment

Figure 6:
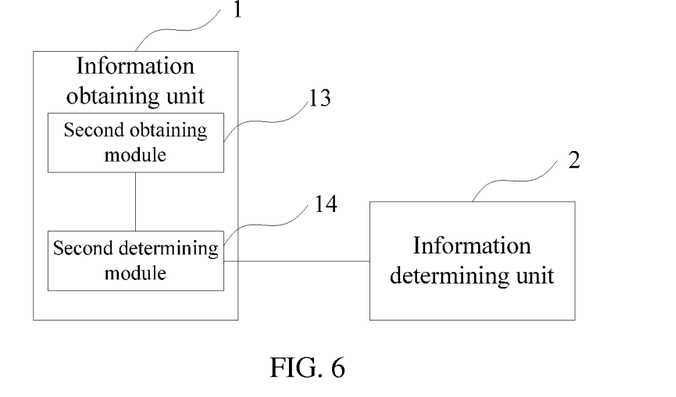
FIG. 6 is a schematic structural diagram of a recognition device disclosed in a sixth embodiment of the present disclosure.

Reference is made to FIG. 6, which is a schematic structural diagram of a recognition device disclosed in a sixth embodiment of the present disclosure.

The input device adapted to the recognition device disclosed in the sixth embodiment includes multiple electrical conductors located at different heights, and the input device connects/disconnects the electrical conductors therein to/from the ground in a preset order.

The recognition device includes an information obtaining unit 1 and an information determining unit 2, with the information obtaining unit 1 including a second obtaining module 13 and a second determining module 14.

The second obtaining module 13 is adapted to obtain, in accordance with a preset strategy, a sequence of capacitance values for distinguishing different input devices. If the switching strategies in accordance with which the input devices connect/disconnect the multiple electrical conductors are different, the second obtaining module 13 may obtain the sequence of capacitance values for distinguishing different input devices in accordance with different preset strategies.

For example, when the user performs the touch control operation on the capacitive touch screen by using multiple input devices, the input devices performs the operation to connect/disconnect the multiple electrical conductors therein to/from the ground in the preset order after it is determined that the input device contacts the capacitive touch screen. And this operation is performed only once and will not be performed repeatedly. Then, the obtaining, by the second obtaining module 13, in accordance with a preset strategy, a sequence of capacitance values for distinguishing different input devices includes: obtaining multiple capacitance values at the position on the capacitive touch screen where the capacitive touch screen contacts the input device; and determining the obtained multiple capacitance values as the corresponding sequence of capacitance values of the input device.

Because the input devices perform the operation to connect/disconnect the multiple electrical conductors therein to/from the ground in the preset order for one time after it contacts the capacitive touch screen, the multiple capacitance values generated at the position on the capacitive touch screen where the capacitive touch screen contacts the input device are all used for distinguishing the input devices.

For example, when the user performs the touch control operation on the capacitive touch screen by using multiple input devices, the input devices perform the operation to connects/disconnects the multiple electrical conductors therein to/from the ground in the preset order period circularly. Then, the obtaining, by the second obtaining module 13, in accordance with a preset strategy, a sequence of capacitance values for distinguishing different input devices includes: obtaining, in a preset time not less than two times of the time required by the input device to perform the operation to connect/disconnect the multiple electrical conductors therein to/from the ground in the preset order, multiple capacitance values at the position on the capacitive touch screen where the capacitive touch screen contacts the input device; searching for the pre-stored corresponding sequence of capacitance values of the input device from the obtained multiple capacitance values; and determining the found sequence of capacitance values as the sequence of capacitance values of the input device.

Because the input device performs the operation to connects/disconnects the multiple electrical conductors therein to/from the ground in the preset order circularly, the capacitance value at the position on the capacitive touch screen where the capacitive touch screen contacts the input device varies continuously when the input device performs the touch control operation on the capacitive touch screen, the obtained capacitance values contain surely the corresponding sequence of capacitance values of the input device if the time required to obtain the capacitance value is not less than two times of the time required by the input device to perform the operation to connect/disconnect the multiple electrical conductors therein to/from the ground in the preset order. The corresponding sequences of capacitance values of the input devices are pre-stored in the electronic device (the corresponding sequences of capacitance values of the input devices are different, then the input devices may be distinguished by the corresponding sequence of capacitance values of the input device), the corresponding sequence of capacitance values of the input device may be determined by performing searching operation in the obtained multiple capacitance values.

Preferably, the preset time is set to be equal to two times of the time required by the input device to perform the operation to connect/disconnect the multiple electrical conductors therein to/from the ground in the preset order. Thereby not only the operation of obtaining the sequence of capacitance values can be achieved, but also the time consumption can be reduced as much as possible.

In the first manner, the input device must have the function of judging whether the input device contacts the capacitive touch screen, thereby the requirement on the hardware of the input device is high, the cost of the input device is correspondingly high, but the time required by the electronic device to recognize the input device is relatively short. In the second manner, the requirement on the hardware of the input device is low, the cost of the input device can be reduced correspondingly, but the time required for obtaining the sequence of capacitance values is relatively long, which results in that the time required by the electronic device to recognize the input device is relatively long.

The second determining module 14 is adapted to obtain electric field height value corresponding to multiple capacitance values in the sequence of capacitance values according to a preset correspondence between the capacitance value and the electric field height value and set the obtained multiple electric field height values as the electric field height information of the input device.

Multiple electrical conductors are provided at different heights in the input device, and each electrical conductor may result in the variation in the capacitance value of the capacitive touch screen after being connected to the ground. The electric field height information of the input device includes multiple electric field height values.

The recognition device disclosed in the sixth embodiment of the disclosure is adapted to the input device in which multiple electrical conductors are provided at different heights. After the sequence of capacitance values for distinguishing different input devices is obtained, the electric field height values matching the multiple capacitance values in the sequence of capacitance values is determined according to the preset correspondence between the capacitance value and the electric field height value, and the attribute information of the input device is determined by setting the multiple electric field height values as the electric field height information of the input device.

An electronic device is further disclosed in the present disclosure, which including a capacitive touch screen which has a function of height detection, while the electronic device further includes any one of the recognition devices disclosed above in the present disclosure which is connected to the capacitive touch screen.

An input device adapted to the above recognition method is further disclosed in the present disclosure.

Figure 7:
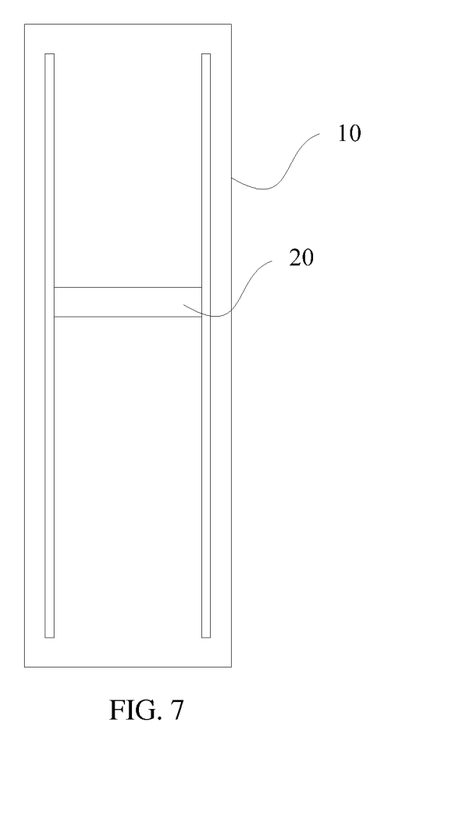
FIG. 7 is a schematic structural diagram of an input device disclosed in a seventh embodiment of the present disclosure.

Reference is made to FIG. 7, which is a schematic structural diagram of an input device disclosed in a seventh embodiment of the present disclosure.

The input device includes a main body 10 and an electrical conductor 20. The electrical conductor 20 is movably connected onto the main body 10, wherein the electrical conductor 20 on the main body 10 is located at an adjustable height, and the electrical conductor 20 has one end thereof connected to the ground.

In implementation, the electrical conductor 20 may be movably connected onto the main body 10 in many manners. For example, a slide rail is provided on the main body 10, and a protrusion adapted to the slide rail is provided on the electrical conductor 20. The electrical conductor 20 is stuck in the slide rail via the protrusion. The position may be adjusted when the electrical conductor 20 is pushed or pulled along the slide rail, so that the height of the electrical conductor 20 on the main body 10 can be adjusted. Alternatively, two slide rails are provided oppositely on the main body 10, the distance between the two slide rails is adapted to the length of the electrical conductor 20, and two ends of the electrical conductor 20 are stuck between the two slide rails directly, so that the movable connection of the electrical conductor 20 with the main body 10 is achieved.

When multiple input devices perform the touch control operation on the capacitive touch screen of the electronic device, if the input devices need to be distinguished, the electrical conductors 20 in the input devices may be provided at different heights (that is, the electrical conductors 20 in the input devices have different electric field height values), the electronic device may detect the electric field height information of the input devices and determine the attribute information of the input devices according to the preset correspondence between the electric field height information and the attribute information of the input device.

In implementation, labels corresponding to different attribute information may be provided on the main body 10. When the user needs to change the attribute information of the input device, the user may adjust the height of the electrical conductors 20 quickly with reference to the label, for reducing the difficulty of the operation of the user.

Figure 8:
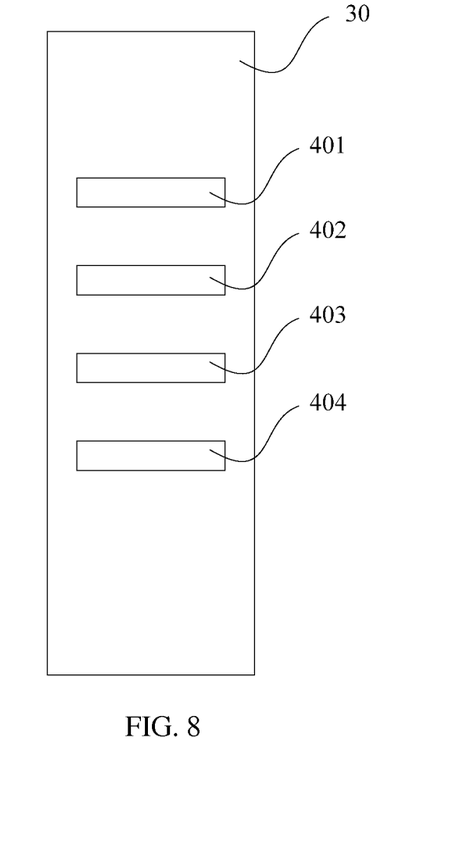
FIG. 8 is a schematic structural diagram of an input device disclosed in an eight embodiment of the present disclosure.

Reference is made to FIG. 8, which is a schematic structural diagram of an input device disclosed in an eighth embodiment of the present disclosure.

The input device includes a main body 30, multiple electrical conductors 401, 402, 403 and 404, and a control circuit. The multiple electrical conductors 401, 402, 403 and 404 are provided at different heights of the main body 30 respectively. The control circuit may connect/disconnect the multiple electrical conductors 401, 402, 403 and 404 to/from the ground respectively.

It is to be noted that FIG. 8 is only a schematic structural diagram of the input device, and the number of the electrical conductor in the input device is not defined in the present disclosure.

Not all the numbers of the electrical conductors provided in different input devices are the same. Alternatively, different input devices may also be provided with the same number of electrical conductors, but not all the electrical conductors are provided at the same height in the input devices. Alternatively, different input devices may also be provided with the same number of electrical conductors, and the electrical conductors are provided at the same height in the input devices, but the orders in which the control circuit connects/disconnects the multiple electrical conductors to/from the ground are different. For the three cases, different input devices have different electric field height information, and when different input devices perform the touch control operation on the capacitive touch screen, the capacitance values generated at the position on the capacitive touch screen where the capacitive touch screen contacts the input devices are different.

In implementation, the control circuit may adopt various structures, and only one of the structures is described in the present disclosure. The control circuit includes a controller and multiple switching tubes. One switching tube is connected in series between one end of each electrical conductor and the ground, control terminals of the plurality of switching tubes are connected to different I/O ports of the controller respectively. The controller controls the connection state between the switching tube and the ground by controlling the switching tube to be on or off.

In the present specification, the embodiments are described in progression, each embodiment mainly focuses on the difference aspect from other embodiments, and reference can be made to these similar parts among the embodiments. The description of the device disclosed in the embodiment is relatively simple, because the device is corresponding to the method disclosed in the embodiment, and reference may be made to the description of the method for the related points.

Those skilled in the art can further understand that the individual exemplary units and steps that are described in conjunction with the embodiment disclosed herein are able to be implemented in the electronic hardware, the computer software or a combination of both the electronic hardware and the computer software, and the components and the steps of the individual examples have been described according to the function generally in the above description, for describing the interchangeability between the hardware and the software clearly. Whether these functions are implemented in hardware or software is determined by the technical solution-specific application and the design constraint condition. For each specific application, the described function can be implemented by those skilled in the art using different method, but this implementation should not be considered as beyond the scope of the present invention.

The steps of the method or the algorithm that are described in conjunction with the embodiment disclosed herein can be implemented by the hardware, the software module performed by the processor or the combination of both the hardware and the software module performed by the processor. The software module can be built in the Random Access Memory (RAM), the memory, the Read-Only Memory (ROM), the electrically programmable ROM, the electrically erasable programmable ROM, the register, the hardware, the movable disc, the CD-ROM, or any other forms of storing medium that is well-known in the technical field.

The above descriptions of the disclosed embodiments enable those skilled in the art to implement or use the present disclosure. Various modifications made to those embodiments will be obvious to those skilled in the art, and the ordinal principles defined in the present disclosure can be implemented in other embodiments without departing from the spirit or the scope of the present disclosure. Therefore, the present invention should not be limited to those embodiments disclosed herein, but should be in coincidence with the widest scope in accordance with the principles and the novel characteristics disclosed by the present invention.

The invention claimed is:

1. A recognition method for an input device including a plurality of electrical conductors located at different heights, applied to an electronic device with a capacitive touch screen which has a function of height detection, different input devices having different electric field height information, wherein the method comprises:
    obtaining a sequence of capacitance values by connecting/disconnecting the plurality of electrical conductors in the input device to/from a ground in a preset order, upon detection of a touch control operation of the input device;
    obtaining electric field height values as the electric field height information of the input device, wherein the electric field height values correspond to multiple capacitance values in the sequence of capacitance values according to a preset correspondence between the capacitance values and the electric field height values; and
    determining attribute information of the input device according to a preset correspondence between the electric field height information and the attribute information of the input device.

2. The method according to claim 1, wherein the attribute information of the input device comprises physical attribute information and/or role attribute information.

3. The method according to claim 1, wherein the attribute information of the input device comprises physical attribute information and/or role attribute information.

4. An input device, adapted to the recognition method for the input device according to claim 1, wherein the input device comprises:
    a main body;
    a plurality of electrical conductors fixedly located at different heights of the main body; and
    a control circuit adapted to connect/disconnect the plurality of electrical conductors to/from the ground respectively.

5. The input device according to claim 4, wherein the control circuit comprises a controller and a plurality of switching tubes; and one switching tube is connected in series between one end of each electrical conductor and the ground, control terminals of the plurality of switching tubes are connected to different I/O ports of the controller respectively.

6. A recognition device, applied to an electronic device with a capacitive touch screen which has a function of height detection, wherein the recognition device comprises:
    an information obtaining unit, adapted to obtain electric field height information of an input device comprising a plurality of electrical conductors located at different heights upon detection of a touch control operation of the input device; and
    an information determining unit, adapted to determine attribute information of the input device according to a preset correspondence between the electric field height information and the attribute information of the input device,
    wherein the information obtaining unit comprises:
        a second obtaining module adapted to obtain a sequence of capacitance values by connecting/disconnecting the plurality of electrical conductors in the input device to/from a ground in a preset order; and
        a second determining module adapted to obtain electric field height values corresponding to multiple capacitance values in the sequence of capacitance values according to a preset correspondence between the capacitance values and the electric field height values and set the obtained electric field height values as the electric field height information of the input device.

7. An electronic device including a capacitive touch screen that has a function of height detection, wherein the electronic device further comprises a recognition device connected to the capacitive touch screen, with the recognition device being the recognition device according to claim 6.

8. An electronic device comprising a capacitive touch screen that has a function of height detection, wherein the electronic device further comprises a recognition device connected to the capacitive touch screen, with the recognition device being the recognition device according to claim 6.

* * * * *